Figure 1:
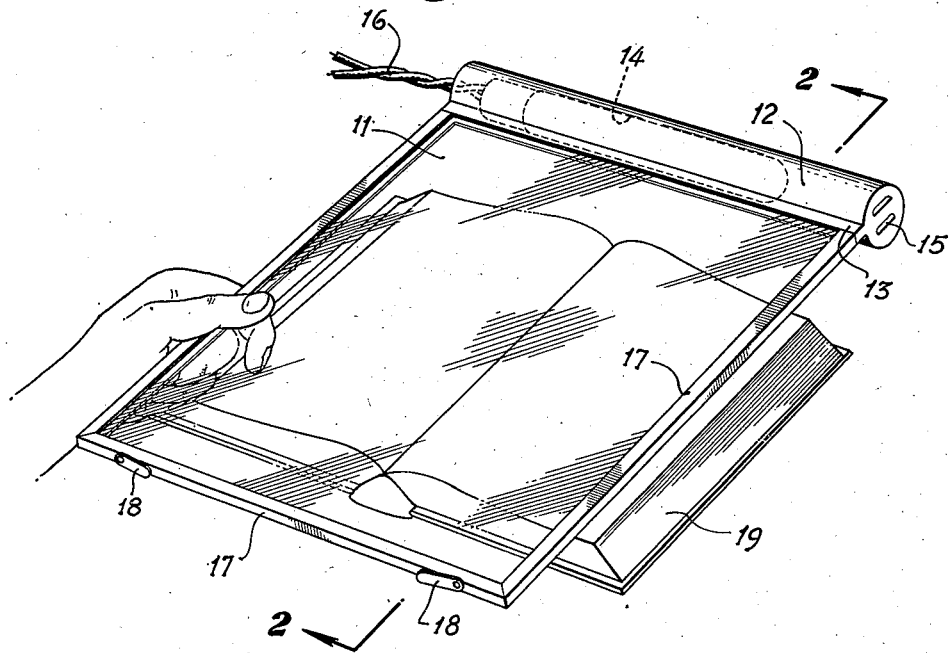

Sept. 12, 1944.    A. A. BEST    2,358,203
COMBINED ILLUMINATING AND VIEWING DEVICE
Filed April 13, 1943

Inventor;
ALBERT A. BEST,
By John H. Rouse,
Attorney.

Patented Sept. 12, 1944

2,358,203

UNITED STATES PATENT OFFICE 2,358,203

COMBINED ILLUMINATING AND VIEWING DEVICE

Albert A. Best, Los Angeles, Calif.

Application April 13, 1943, Serial No. 482,929

4 Claims. (Cl. 240—2)

My present invention relates to illuminating devices, and more particularly to an illuminating device which comprises a sheet of transparent material adapted to be positioned near an object to be illuminated and between that object and the eyes of an observer.

An object of this invention is to provide, in a device of the character described, means whereby only the object under observation is illuminated, and substantially no other light rays are emitted by the device.

Another object is to provide a device, of the character described, which includes a source of light so arranged with respect to the transparent sheet that its rays are confined substantially solely to the edge thereof, so that the only light reaching the object is that dispersed in a direction generally at right-angles to the sheet; an ancillary object being to provide means for masking that portion of the edge of the sheet which is not subjected to the light from the source.

The illumination produced by the device of this invention is relatively weak but nevertheless ample for purposes such as reading in a darkened room, inasmuch as the illumination is confined substantially solely to the object being viewed (to which it is preferably in close proximity) and is emitted in uniform intensity from the entire illuminating surface of the device—through which surface the object is viewed. By the aid of this device one may read in bed without disturbing other nearby occupants of the bedroom, since, in normal use, no light from the device is visible at a distance of more than a foot or so away from it. For the same reason, the device has particular utility during war-time "black outs"; and, when equipped with portable electric batteries, may advantageously be employed by air-raid wardens or the like.

Figure 2:
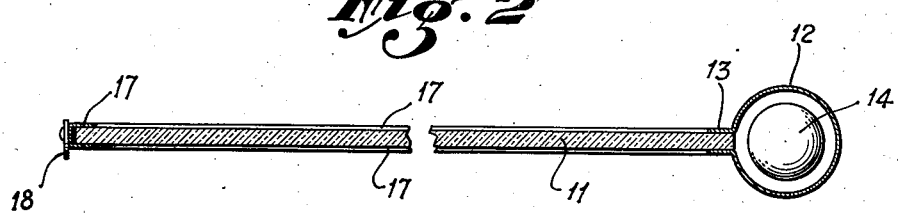

Other objects and advantages of the invention will be found in the description, the drawing, and the claims; and, for full understanding of the invention, reference may be had to the following detailed description and accompanying drawing, wherein:

Figure 1 is a view, in perspective, of a device embodying my invention, shown in the position in which it is employed for illuminating an object; and Figure 2 is an enlarged sectional view of the device taken along the line 2—2 of Fig. 1.

In the drawing, the numeral 11 indicates a rectangular sheet of transparent material, on the upper edge portion of which is mounted a tubular housing 12, of opaque material. In the side wall of the housing there is an elongated narrow opening, and the material of the housing at that opening is extended outwardly to form a socket 13 for closely receiving the marginal end portion of the sheet. The housing 12 contains an electric lamp 14 and is closed at its ends, except for the provision at one end of ventilation louvers 15, and at the other end of an opening for the lamp cable 16. The lamp may be of the type which includes elongated incandescent filaments, or of the gas-discharge or fluorescent type. While the lamp is preferably relatively long, as shown, it is not essential that it should be, since satisfactory results have been obtained with a small lamp (particularly when the inner surface of the housing has good reflecting properties) when the material of sheet 11 has a high coefficient of transmission.

Around the other edge portions of the sheet is a channelled frame 17, of opaque material, which is suitably secured at its upper ends to the socket 13 of housing 12. Mounted on the bottom edge of the frame 17 is a pair of fingers 18 which, when swung downward, extend below the plane of the sheet to the level of the underside of housing 12, so that, if the device is rested on a plane surface, sheet 11 will be in parallel spaced relation thereto.

The light from source 14, after entering the top edge of the sheet 11, is reflected back from the other three edges of the sheet in a considerable amount (as in a prism) and is thus uniformly distributed throughout the sheet; some of the light within the sheet being dispersed in a direction substantially at right-angles thereto, so that when the device is placed over an object, such as the book 19, the same is illuminated. Obviously, some of the light also passes toward the eyes of the observer, but not in such amount as to be annoying or even noticeable, since the eyes are relatively far from the sheet, whereas the object is preferably quite close to it, as shown. The dispersion from the sheet of light sufficient, for example, for reading purposes, is probably due to the innumerable minute irregularities and scratches which are present even in a surface that appears to the eyes to be quite smooth and polished. As is shown in Fig. 2, the edges of the sheet are substantially at right-angles to the plane of the sheet.

The sheet 11 may be of any transparent material that has a high coefficient of transmission—such as fused quartz; "Pyrex"; most optical glasses; or many organic plastics, such as, for example, that popularly known by the trademark "Lucite." Such organic plastics are preferred because, in addition to posessing excellent light-transmitting properties, they are relatively unbreakable, are able to withstand change of temperature (if a lamp of the incandescent type is employed), and are comparatively cheap. The material should be relatively free from color, since its presence impedes the transmission of "white" light. Common glass is not suitable except for small sheets, for the reason that its absorption of light is too great, partly due to the color usually present, as can be determined by viewing a sheet of it at its edge.

Provision of means for masking the side and bottom edges of the sheet, as by the frame 17, is usually necessary, since these edges are brightly illuminated. The brightness of the edges can be dispelled by the application thereto of a dead-black coating or paint; however, thereby the internal reflection of the light within the sheet is greatly reduced, and the provision of a masking frame is preferred, since, even if it is in direct mechanical contact with the edges, it does not reduce the internal reflection. The frame is preferably arranged to overlap the margins of the sheet, as shown, so that the bright edges of the sheet are not visible to the user of the device. Best results are obtained when the sheet is out of direct engagement with the object being viewed, and this is particularly important when the viewing sheet is of material such as "Lucite," as the portion of the object in contact with the surface of a sheet of such material is (for some reason that is not clear) poorly illuminated. When the device is in use, it should therefore be spaced from the object by means of the user's fingers (as shown), or by means such as the mechanical fingers 18.

While I have herein shown and described a specific embodiment of my invention, I wish it to be understood that modifications may be made without departing from the spirit of the invention, and that I intend therefore to be limited only by the scope of the appended claims.

I claim as my invention:

1. In an illuminating and viewing device: a rigid sheet of transparent material having plane opposite surfaces of substantial area and adapted to be interposed between an object to be illuminated and viewed and the eyes of an observer, and in spaced relation to said object; a source of light mounted on a marginal portion of said sheet; means for confining the light of said source substantially solely to the edge of said portion; and opaque means for masking the edge of the remaining portion of the sheet and overlapping the entire margin of at least one of said plane surfaces thereof.

2. In an illuminating and viewing device: a generally rectangular rigid sheet of transparent material having plane opposite surfaces of substantial area and adapted to be interposed between an object to be illuminated and viewed and the eyes of an observer, and in spaced relation to said object; an elongated tubular housing of opaque material having a narrow opening for closely receiving one edge portion of said sheet; a source of light in said housing; and a channelled frame of opaque material surrounding the other edges of said sheet.

3. An illuminating and viewing device, as defined in claim 2, wherein said sheet is composed of a substantially colorless organic plastic.

4. An illuminating and viewing device, as defined in claim 2, wherein means are provided for maintaining said sheet in spaced relation to said object when the same is substantially flat.

ALBERT A. BEST.